United States Patent
Ishida et al.

(10) Patent No.: US 6,577,880 B1
(45) Date of Patent: Jun. 10, 2003

(54) RADIO COMMUNICATION METHOD AND RADIO COMMUNICATION SYSTEM

(75) Inventors: Kazuhito Ishida, Yokohama (JP); Seiko Shimogama, Yokohama (JP); Toshiaki Kurokawa, Yokohama (JP); Tsutomu Yamaguchi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 494 days.

(21) Appl. No.: 09/619,668

(22) Filed: Jul. 19, 2000

(30) Foreign Application Priority Data

Jul. 19, 1999 (JP) .......................................... 11-204745

(51) Int. Cl.[7] .......................... H04Q 7/20; H04B 1/38; H04M 1/00
(52) U.S. Cl. ...................... 455/562; 455/446; 455/561
(58) Field of Search ................................. 455/446, 561, 455/562, 550, 435, 450, 452, 453, 456, 432, 436, 438, 440, 442, 443

(56) References Cited

U.S. PATENT DOCUMENTS

| 5,596,333 A | * | 1/1997 | Bruckert | 342/457 |
| 5,848,358 A | * | 12/1998 | Forssen et al. | 455/437 |
| 6,212,407 B1 | * | 4/2001 | Hiramatsu | 455/562 |

* cited by examiner

*Primary Examiner*—Nguyen T. Vo
*Assistant Examiner*—Edan Orgad
(74) *Attorney, Agent, or Firm*—Antonelli, Terry, Stout & Kraus, LLP

(57) ABSTRACT

Even if traffic concentrates on a specific place in a cellular radio communication in which a base station communicates with its corresponding wireless terminal, power to be used up or consumed by the base station can be restricted. Further, the equality of communication is satisfactory and the need for a change in the conventional wireless terminal is eliminated. Therefore, two types of sectors corresponding to a wide range sector and narrow range sectors each overlapping with the wide range sector are defined in a multi-sector model. Further, a wide range antenna for the wide range sector and narrow range antennas for the narrow range sectors are separately prepared for the base station. Afterwards, signals are transmitted to wireless terminals located within the narrow range sectors by using both the wide range antenna and the narrow range antennas. In the case of CDMA in particular, the same signal is transmitted with respect to a traffic channel alone.

15 Claims, 11 Drawing Sheets

RADIO COMMUNICATION METHOD AND RADIO COMMUNICATION SYSTEM

BACKGROUND OF THE INVENTION

1. Field of the Invention

The present invention relates to a radio communication method and a radio communication system, and particularly to a radio communication method and a radio communication system suitable for use in the case where in a radio communication system such as a cellular system, traffic concentrates on a specific place in a multisector model wherein one cell is operated as a plurality of sectors.

2. Description of the Related Art

Attention has recently been focused on CDMA (Code Division Multiple Access) as a communication method suitable for a mobile radio or wireless terminal such as a cellular phone. A multisector model of a type wherein a cell is divided into a plurality of sectors and operated in this condition, has been proposed as a communication model for the CDMA.

A description will first be made of a communication model for a radio communication system according to a related art with reference to FIG. 11.

FIG. 11 is a conception diagram showing a configuration of the communication model for the radio communication system according to the related art.

A base station 11 is connected to a base station controller 13 through a communication line 12. The base station controller 13 is connected to an exchange or switching system 14. Further, the base station controller 13 is connected to one or plural base stations 11 through the communication line 12 and has the function of performing switching between signals sent from the termination of a radio interface and each base station 11, switching between channels, etc.

In the present example as well, one cell operated by the base station 11 is divided into three sectors S1 through S3 by directivity antennas. In such a conventional CDMA cellular system, the sectors S1 through S3 constituting the cell are transmitted in the form of uniform transmitting power distributions at in-sector angles. Traffic for entire sector has been taken into consideration at this time but a traffic distribution inside each sector is not taken into consideration. Further, a Rake receiver has been known as a CDMA diversity technique. The Rake receiver has been described in the following:

R. D. Blakeney, et al, "Demodulation Element Assignment in a System Capable of Receiving Multiple Signals", U.S. Pat. No. 5,490,165 Feb. 6, 1996, and the like.

In radio communications, transmitting power also commonly increases with an increase in traffic. In the case of actual traffic, however, traffic-concentrated locations and relatively traffic non-concentrated locations exist. In the example illustrated in FIG. 11, for instance, areas or the like around stations A and B are considered to be traffic-concentrated locations.

Therefore, the base station 11 should inevitably increase transmitting power. However, a uniform increase in transmitting power with respect to a cell results in the use of much transmitting power even at a low traffic portion, thus causing waste. Since the transmitting power can be changed every sectors in the case of such a multisector that one cell is divided into the sectors as shown in FIG. 11 as compared with it, the wastage of the transmitting power can be limited to some extent. In order to restrict the transmitting power in total, the sector may be divided into pieces with respect to an area in which traffic is expected to concentrate. However, when the sector is excessively divided into pieces, channels must be prepared for communications at their boundaries, thus causing a problem on a so-called handoff margin that the number of effective channels decreases, and a problem that handoff often occurs at terminals of users who moves at high speed. Interference between sectors also offers a problem. It is therefore hard to ensure the quality of communication.

BRIEF SUMMARY OF THE INVENTION

The present invention has been made to solve the above-described problems. The present invention provides a radio communication method and a radio communication system wherein even if traffic concentrates on a specific place in a cellular radio communication in which a base station communicates with its corresponding wireless terminal, power to be used up or consumed by the base station can be restricted, and the equality of communication is good and the need for a change in the conventional wireless terminal is eliminated.

According to a first aspect of the invention, there is provided a cellular radio communication method for performing communications between a base station and each of wireless terminals, comprising the steps of dividing a cell for covering the base station into several sectors, defining the sectors as a wide range sector and two types of narrow range sectors which overlap with the wide range sector, separately preparing a wide range antenna for covering the wide range sector and narrow range antennas for respectively covering the narrow range sectors within the base station, and transmitting signals to wireless terminals located within the narrow range sectors by using both the wide range antenna and the narrow range antennas.

In the radio communication method, the signal transmitted through the wide range antenna and the signals transmitted through the narrow range antennas are set so as to become the same signal.

In the radio communication method, when a plurality of narrow range sectors exist within one wide range sector, respective coverages for the plurality of narrow range sectors do not overlap in position.

In the radio communication method, the base station receives signals sent from the wireless terminals by the wide range antenna and one narrow range antenna and combines both received signals together to thereby extract a combined signal.

According to a second aspect of the invention, there is provided the radio communication method wherein the communications between the base station and the wireless terminals are based on CDMA (Code Division Multiple Access).

In the radio communication method, the base station transmits only a signal on a traffic channel within channels handled by CDMA by using both the wide range antenna and one narrow range antenna.

In the radio communication method, the base station extracts downlink power control information included in the signals sent from the wireless terminals and controls transmitting power directed toward each wireless terminal according to the downlink power control information upon transmission of the signals through the wide range antenna and the one narrow antenna.

In the radio communication method, the base station controls a transmitting power ratio directed toward each wireless terminal according to the ratio between the strengths of the signals from the wireless terminals, which are received by the wide range antenna and the narrow range antennas upon transmitting the signals through the wide range antenna and the one narrow range antenna.

In the radio communication method, the transmitting power ratio directed toward the wireless terminal is determined in advance by the base station upon transmitting the signals through the wide range antenna and the narrow range antennas.

In the radio communication method, both the base station and the wireless terminal Rake-combine received signals upon combination thereof.

According to a third aspect of the invention, there is provided a cellular radio communication system for performing communications between a base station and each of wireless terminals, comprising a cell for covering the base station, the cell being divided into several sectors which are defined as two types of sectors corresponding to a wide range sector and narrow range sectors overlapping with the wide range sector, and the narrow range sectors having coverages provided so as not to overlap in position, and wherein the base station includes a wide range antenna for covering the wide range sector, narrow range antennas for respectively covering the narrow range sectors, a transmitter for transmitting signals to wireless terminals located within the narrow range sectors by using the wide range antenna and the narrow range antennas, a receiver for combining a signal received by the wide range antenna and signals received by the narrow range antennas together to thereby extract a combined signal, and a controller for controlling the transmitter and the receiver, and the controller controls the transmitter so that the transmitter transmits signals to the wireless terminals located within the narrow range sectors through both the wide range antenna and the one narrow range antenna.

In the radio communication system, the communications between the base station and each wireless terminal are based on CDMA, and the controller in the base station controls the transmitter so that the transmitter transmits only signals on traffic channels as the same signal from both the wide range antenna and the one narrow range antenna.

In the radio communication system, the controller in the base station controls a transmitting power ratio directed toward each wireless terminal according to the ratio between the strengths of the signals from the wireless terminals, which are received by the wide range antenna and the narrow range antennas upon transmitting the signals through the wide range antenna and the one narrow range antenna.

In the radio communication system, the wide range antenna and each narrow range antenna of the base station transmit polarized signals different from one another, and each wireless terminal has an antenna for receiving both polarized signals and a receiver for combining the received polarized signals together to thereby take out a combined signal.

According to a fourth aspect of the invention, there is provided a base station suitable for use in a cellular radio communication system for carrying out communications between the base station and each of wireless terminals, wherein a cell for covering the base station is divided into several sectors, which are defined as two types of sectors corresponding to a wide range sector and narrow range sectors overlapping with the wide range sector, and the narrow range sectors have coverages provided so as not to overlap in position, and wherein the base station includes a wide range antenna for covering the wide range sector, narrow range antennas for respectively covering the narrow range sectors, a transmitter for transmitting signals to wireless terminals located within the narrow range sectors by using the wide range antenna and the narrow range antennas, a receiver for combining a signal received by the wide range antenna and signals received by the narrow range antennas together to thereby extract a combined signal, and a controller for controlling the transmitter and the receiver, and the controller controls the transmitter so that the transmitter transmits signals to the wireless terminals located within the narrow range sectors through both the wide range antenna and the one narrow range antenna.

Typical ones of various inventions of the present inventions have been shown in brief. However, the various inventions of the present application and specific configurations of these inventions will be understood from the following description.

BRIEF DESCRIPTION OF SEVERAL VIEWS OF DRAWING

While the specification concludes with claims particularly pointing out and distinctly claiming the subject matter which is regarded as the invention, it is believed that the invention, will be better understood from the following description taken in connection with the accompanying drawings in which:

DETAILED DESCRIPTION OF THE INVENTION

Respective embodiments according to the present invention will hereinafter be described with reference to FIGS. 1 through 10.

In the respective embodiments, a CDMA cellular radio communication system will mainly be explained as an illustrative example. This is because the CDMA system is a communication method expected to be best applied for the present invention.

A first embodiment according to the present invention will be described below using FIGS. 1 through 8.

(I) Sector Model to Which the Present Invention is Applied

A communication model to which the present invention is applied, will first be described using FIG. 1.

Figure 1:
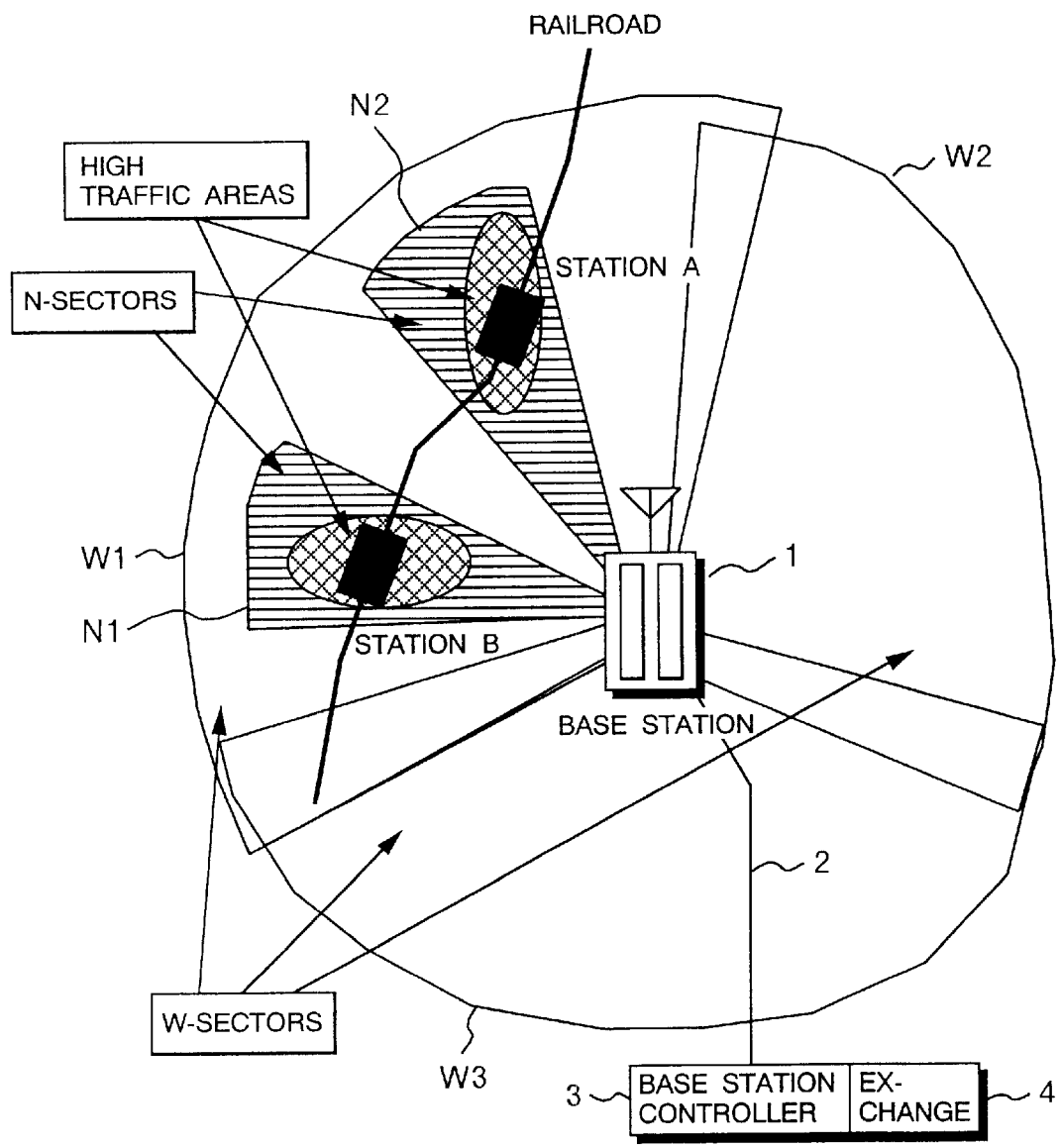
FIG. 1 is a conceptional diagram showing a sector model for cellular communications, according to a first embodiment of the present invention.

FIG. 1 is a conceptional diagram showing a sector model for a cellular communication, according to the first embodiment of the present invention.

The communication model according to the present invention is predicated on a cellular communication system. Namely, when each of wireless or radio terminals communicates with a base station, a coverage for allowing the base station to communicate with each radio terminal lying therein is taken in cell form and a service area is covered with such a cell. Thereafter, the cell is further divided into management or control areas called fine sectors.

As shown in FIG. 1, a base station 1 such as a CDMA wireless or radio base station is connected to a base station controller 3 through a communication line 2. The base station controller 3 is connected to an exchange or switching system 4 through the use of a predetermined interface.

Thus, the base station controller 3 is connected to one or plural base stations 1 through the communication line 2 and has the function of performing switching between signals sent from a termination of a radio interface and each base station 1, switching between channels, etc.

The present invention is characterized by how to make sector's division. Namely, the concept of wide angle sectors (W-sectors) for covering each cell at wide angles and narrow angle sectors (N-sectors) for covering the cell inside the W-sectors at narrow angles will be introduced into the present invention. As to how to take areas, the N-sectors take areas so that each W-sector is overlaid with their areas. The N-sectors take areas so that they are not overlaid with their areas.

In the embodiment illustrated in FIG. 1, one cell operated by the base station 1 is divided into three W-sectors W1 through W3. In the W-sectors W1 through W3, signals are transmitted to in-sector areas every their angles in the form of uniform transmitting power distributions. Further, the W-sector W1 is overlaid with an N-sector N1 and an N-sector N2. For example, high traffic areas on which traffic is concentrated geographically or on a time base, are supposed to exist in their overlaid areas as in the case of railway stations shown in the present embodiment.

Non-overlaid areas thereof are given as areas low in traffic as compared with such high traffic areas. They are covered with the W-sector W1 alone.

The N-sectors in each W-sector are implemented by their corresponding independent directivity antennas. Further, they may be implemented by adaptive array antennas.

(II) Requirements of Signals at the Time that the Sector Model According to the Present Invention is Used While signals are transmitted to W-sectors and N-sectors in the sector model described above, the conventional wireless or radio terminal may desirably be used as it is when the present invention is applied thereto. Wireless terminals commonly have functions each capable of coping with a multipath. Namely, areas overlaid with W- and N-sectors need to be able to effectively receive signals sent from a base station owing to the use of these functions.

Therefore, two types of methods are roughly considered as how to send the signals from the base station 1.

(1) The same signal is used as signals for W-sectors and N-sectors.

(2) The signals for the W-sectors and N-sectors do not necessarily require the same one and share the use of a channel (overhead channel) related to control.

The above method (1) presents no problem because two types of signals are considered to have been transmitted through a multipath determining from a wireless-terminal standpoint.

The above method (2) needs to be able to receive signals for channels (traffic channels) about user data at N-sectors without contradictions upon sharing the use of the overhead channel. Therefore, transmission timing synchronization at a chip level must be ensured with respect to a signal for a W-sector and a signal for each N-sector. Here, the synchronization at the chip level indicates a state in which each individual chips (or bits or the like) are in sync with one another when a signal having a logical level is coded by orthogonal coding or the like and subjected to a diffusing process (scrambled).

As will be described in the following (III), the communication method described in (2) is advantageous as compared with the method (1) because a signal corresponding to the overhead channel at each N-sector is not transmitted.

A description will now be made of communications between each wireless or radio terminal and the base station 1 with the above as a presumption in the following manner.

In regard to a downlink (transmission of base station 1) wireless terminals located in the high traffic areas as in the peripheries of stations A and B respectively receive radio waves from both antennas for the W-sector 1 and N-sector N1 or N-sector N2. Each of the wireless terminals recognizes each of signals sent from the W-sector and N-sectors as a multipath. The radio terminal Rake-combines the received signals by using the Rake receiver as is often carried out.

As to an uplink (transmission of wireless terminal) on the other hand, when wireless terminals are located in the high traffic areas as in the peripheries of the stations A and B, the base station 1 receives each of signals as space diversity (or multipath) based on the W-sector 1 and N-sector N1 or N-sector N2. The received signals are combined into one according to the same method as that employed in a base station having a common multi-sector configuration.

(III) Transmitting Power at Downlink (III-1) Transmitting Power Every Channels for W-sectors and N-sectors A description will next be made of how transmitting power would change when communications are made according to the method (2), with reference to FIG. 2.

FIG. 2 is a schematic diagram showing transmitting power every channels for signals used for W- and N-sectors.

In the present embodiment, the configuration of each channel will be described by TIA/EIA/IS-95A corresponding to one of main specifications of CDMA as an example.

As described above, the base station 1 transmits signals to the wireless terminals as the signals for the respective sectors by using a W-sector antenna and N-sector antennas. However, since the communication method described in the above (2) is used herein, the two, i.e., the base station and each wireless terminal differ from each other in the transmission of the overhead channel alone.

Figure 2A:
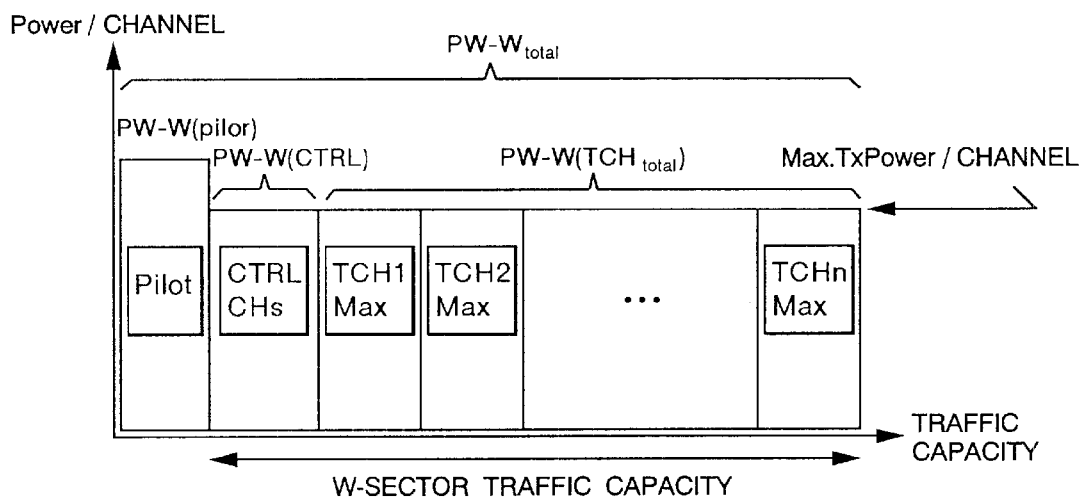
FIG. 2 is a schematic diagram illustrating transmitting power every channels for signals used for W-sectors and N-sectors.

FIG. 2(a) shows transmitting power for the signal used for the W-sector. In the W-sector, the type of channel to be transmitted upon downlink may include a Pilot channel, a CTRL channel (which comprises a Sync channel and a Paging channel in IS-95A), and a Traffic channel. Of these, those corresponding to the overhead channel described above are the Pilot channel and CTRL channel. These channels bear roles such as synchronous control, the transfer of system information, etc.

Figure 2B:
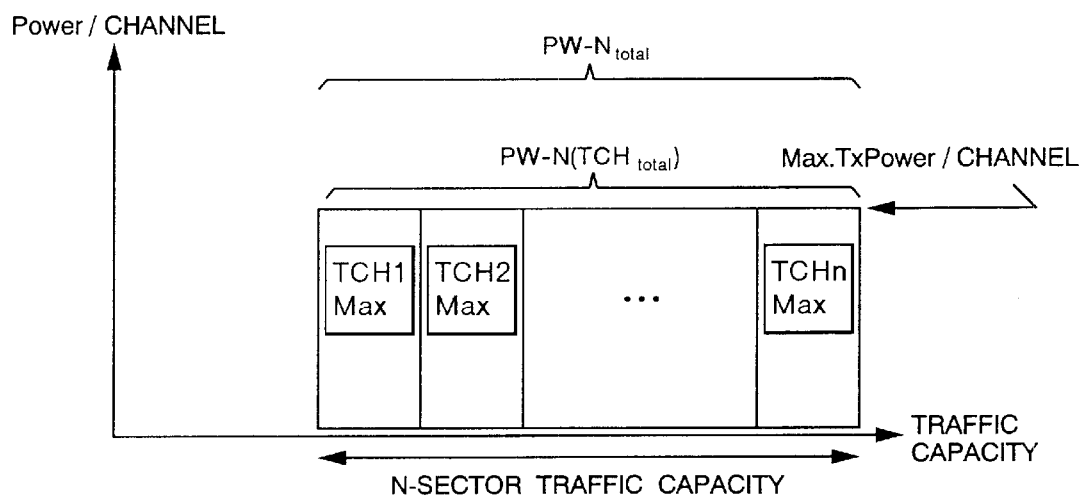

FIG. 2(b) shows transmitting power for the signal used for each N-sector. It is understood that there is no one corresponding to the overhead channel as compared with the W-sector. Namely, only the traffic channel is transmitted in each N-sector.

Incidentally, the maximum transmitting power for each channel is shown in this graph, and transmitting power used in each actual channel falls within such a range.

A ratio between actual transmitting power for such each traffic channel and transmitting power at each of the W- and N-sectors is determined according to the position of the wireless terminal, power control information sent therefrom, and power ratios received at respective sectors as will be described later. Details on the determination of a power ratio between the W- and N-sectors will be described later. Further, the transmitting power for both sectors are controlled independently every traffic channels.

(III-2) Geographical Distribution of System Capacity

A geographical distribution of system capacities under the aforementioned sector model will next be explained using FIG. 3.

FIG. 3 is a schematic diagram showing the sector model according to the present embodiment and the geographical distribution of system capacities in contrast with each other.

Figure 3A:
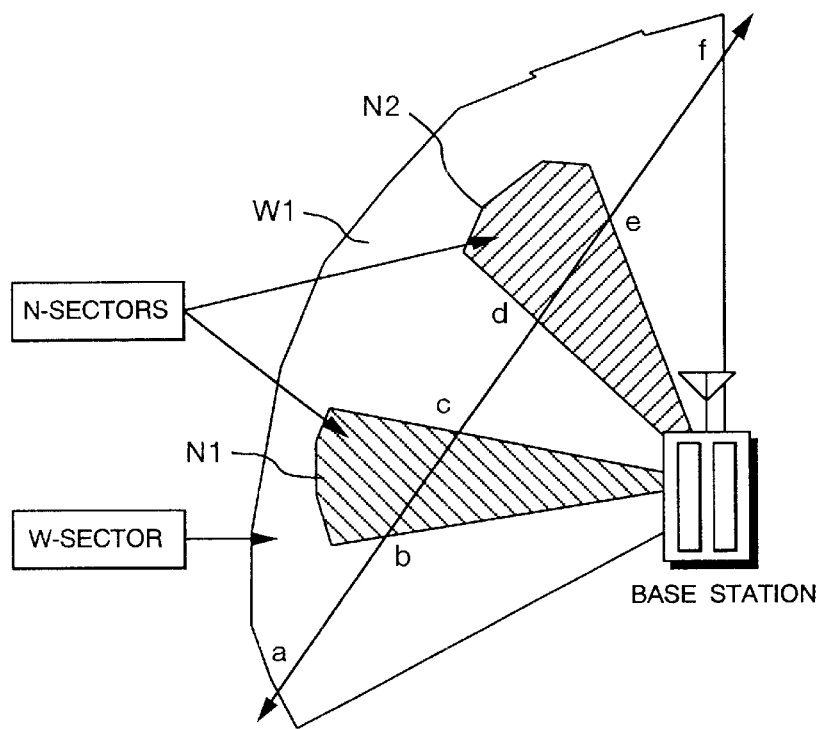
FIG. 3 is a schematic diagram depicting the sector model according to the first embodiment of the present invention and a geographical distribution of system capacities in contrast with each other.
Figure 3B:
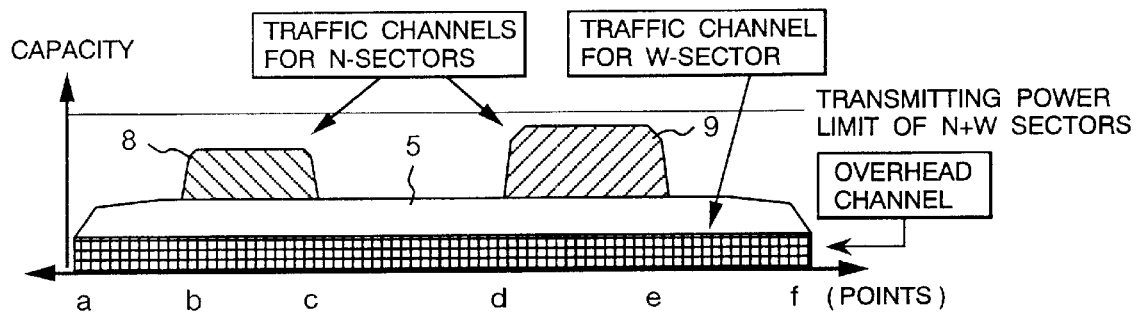

Let's explain system capacities (transmitting power limits or limitations at the time that the sector model is regarded as a communication system) at the W-sector W1 and the N-sector N1 and N-sector N2 with which it is overlaid, employed in the sector model shown in FIG. 1 by way of example. FIG. 3(b) shows a distribution of system capacities at a sector cross-section taken by arrow in FIG. 3. Positions a, b, c, d, e and f in FIG. 3(a) correspond to respective locations of the sector cross-section in FIG. 3(b) respectively.

The entire W-sector W1 comprises high traffic areas around the stations A and B and a low traffic area other than those. The way to think the present invention aims to keep the system capacity low in the low traffic areas and keep the system capacity high in the high traffic areas. As shown in FIG. 3(b) the capacity of a low traffic area other than the N-sectors coincides with that of the W-sector W1, and the capacity of the W-sector W1 is set low as compared with the limitation of the CDMA system capacity.

On the other hand, since the signals are independently transmitted in the N-sectors N1 and N2 corresponding to the high traffic areas, the capacities thereof are taken up to the limitation of the CDMA system capacity as shown in FIG. 3(b) Power can be distributed to areas large in traffic on an emphasis basis, and waste power consumption can be eliminated as compared with the uniform distribution of power, thus resulting in power savings.

(IV) Summary of Control at Wireless Terminal

A summary of control at each wireless terminal will next be explained to clarify the feature of the present invention.

Registering the position of each wireless terminal is effected on a W-sector. Namely, the base station is transmitting signals while being conscious of or recognizing sectors like the W-sector and N-sectors, whereas the wireless terminal recognizes the W-sector and the N-sector as the same one sector.

Therefore, call control at the time that the wireless terminal originates a call and the base station originates a call, are identical to the normal multi-sector's system operation. A new function is not required in particular.

A description will next be made of control on the movement of the wireless terminal between the W-sector and each N-sector.

When the wireless terminal is located in an area in which both sectors are overlaid with each other, a signal transmitted from the wireless terminal is received by antennas for both sectors. A base station reception system Rake-combines the signals received by both sectors into one as in the case where their combining is carried out in the CDMA communication being under calling. Thus, the wireless terminal is able to communicate with the base station without completely recognizing the W-sector and each N-sector even if it receives the signals lying between the respective sectors. Since the wireless terminal recognizes the W-sector and each N-sector as one sector as a matter of course, it is unnecessary to carry out a handover procedure at the boundary between the W-sector and the N-sector.

(V) Configurations and Operation of Base Station and Wireless Terminal

A configuration and operation of a radio or wireless terminal according to the present invention will first be explained with reference to FIG. 4.

Figure 4:
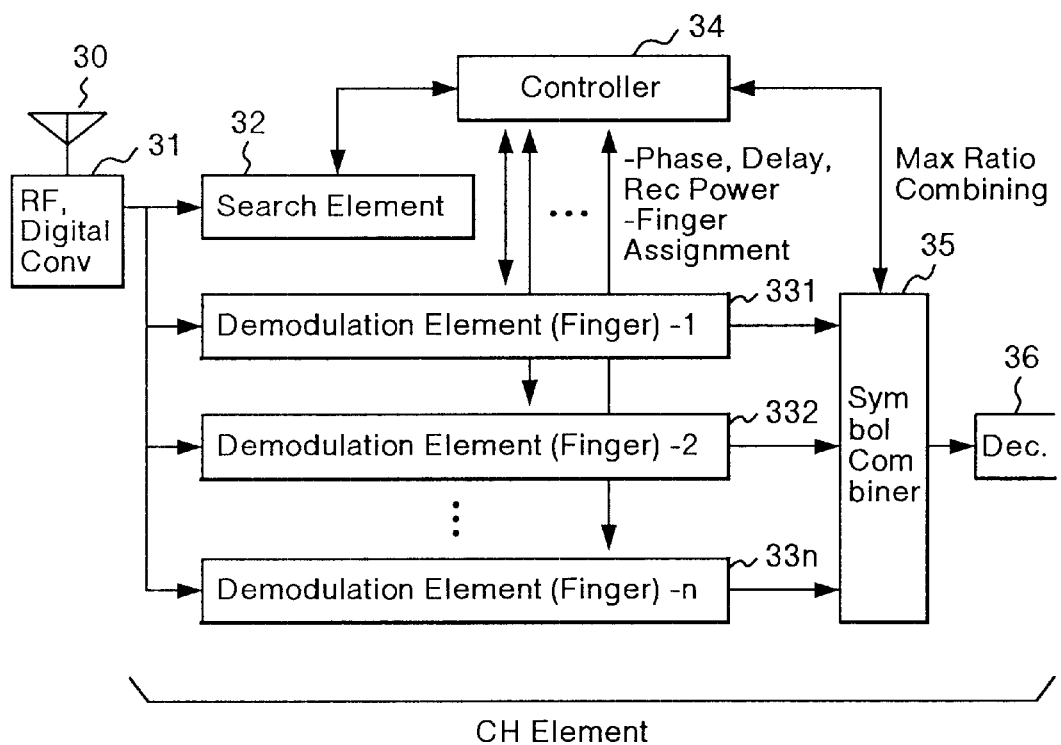
FIG. 4 is a block diagram showing a configuration of a radio terminal according to the present invention.

FIG. 4 is a block diagram showing a configuration of the wireless terminal according to the present invention.

The example shown in FIG. 4 illustrates a configuration of a wireless terminal reception system using a Rake receiver in the CDMA communication. While a wireless terminal is normally provided with a reception system and a transmission system, the wireless terminal used in the radio communication system according to the present invention remains unchanged as compared with the conventional wireless terminal. Since the Rake reception bears an important role, only the reception system will be described in brief.

The wireless terminal comprises a RF digital conv. 31, a search element 32, demodulation elements (fingers) 33 (respective elements are designated at numeral 33$i$), a controller 34, a symbol combiner 35, and a dec. 36. The RF digital conv. 31 is electrically connected to an antenna 30 and includes a digital converter. Further, the dec. 36 comprises a Viterbi dec., for example.

As to a plurality of multipath-based signals received by the RF digital conv. 31, the phases of respective pulses thereof are determined by the search element 32. The controller 34 assigns the respective signals to their corresponding demodulation elements 33$l$ through 33$n$ according to the output of the search element 32 and effects adjustments and control about phases, delays, the estimation of power, timing provided to input the signals to the demodulation elements 33, etc. on the received signals.

Further, the symbol combiner 35 assigns weights to the phases, delays, amplitudes, etc. of the multipath-based signals under the control of the controller 34 and combines the received signals into one by their addition. This will be so-called "Rake combination". Thus, the wireless terminal is able to receive even a weak signal satisfactorily. The combined signal is decoded by the dec. 36.

In the present invention as already mentioned above, the signals transmitted from the W-sector and the N-sectors are in synchronization such as chip synchronization and the same code is used therefor. Namely, the wireless terminals recognizes the received signals as the signals sent from the same sectors without drawing a distinction between both sectors and receives them therein. Further, even if the signals sent from the W-sector and the N-sectors are received with being shifted in time for the purpose of a propagation delay, the wireless terminal is capable of recognizing them as multipaths and receiving the same.

(V-2) Base Station Transmission System

A configuration and operation of a transmission system of a base station, according to the present invention will next be explained with reference to FIG. 5.

Figure 5:
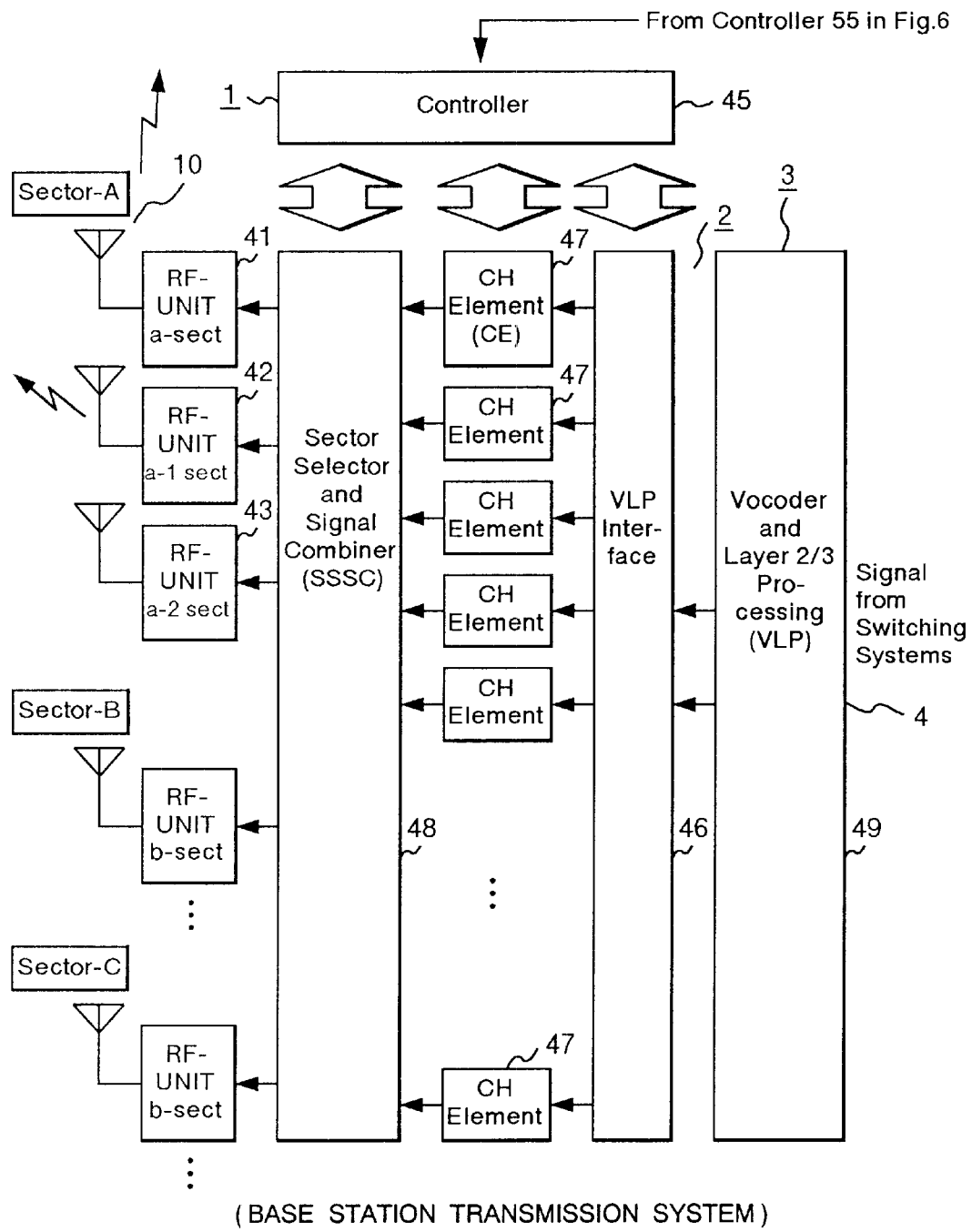
FIG. 5 is a block diagram illustrating a configuration of a base-station transmission system according to the present invention.

FIG. 5 is a block diagram showing a configuration of the base station transmission system according to the present invention.

A description will now be made of a configuration of a base station at the time that the sectors are set as shown in FIG. 1. The cell shown in FIG. 1 was divided into the three sectors: W-sector W1, W-sector W2 and W-sector W3 as the W-sectors, and N-sector N1 and N-sector N2 used as the N-sectors with which the W-sector W1 is overlaid. Therefore, the W-sector W1, W-sector W2 and W-sector W3 will be represented as a sector A, a sector B and a sector C in the form of symbols.

Since the W-sector W1 is overlaid with the N-sector N1 and N-sector N2, the W-sector itself and the N-sector N1 and N-sector N2 will respectively be represented as an a-sector, and an a-1 sector and an a-2 sector in the form of symbols.

The base station transmission system comprises antennas provided every sectors, RF-UNITs 41 through 43, a controller 45, a vocoder and layer 2/3 processing interface (VLP interface) 46, channel elements (CH elements) 47, and a sector selector and signal combiner 48.

A base station controller or control device 3 has a VLP 49 having a vocoder and layer 2/3 processing unit and processes received signals sent from exchanges of switching systems 4. The VLP 49 performs a voice coding process and processes such as link establishment of a layer 2 and the delivery of a signal for a layer 3, etc. The output of the VLP 49 is inputted to the VLP interface 46 of the base station 1 through a communication line 2.

The VLP interface 46 has a multiplexer for multiplexing each signal. Both blocks of the base station transmission system/reception system effect signal processing on packet signals or ATM or the like in the form of signal formats. It is necessary to perform a process for converting traffic signals and signaling (control signal) or the like in the channel elements 47 into these formats. The VLP interface 46 is a part which governs or controls such a converting function. The VLP interface 46 also has the function of operating as a transmission device provided between the channel elements 47 and the VLP 49. In the case of the CDMA, the VLP interface 46 often serves as a packet or ATM cell multiplexer.

The controller 45 controls transmitting power information at the RF-UNITs 41 through 43 or the like, the sector selector and signal combiner 48 and the channel elements 47 and performs confirmation as to whether they are operated as pre-set system parameters and corrections on the parameters. Further, the controller 45 manages or controls resources about the assignments of the channel elements 47 to transmission lines. Here, the resources may include, for example, assigned hardware, codes, signal power, allowable interference power, etc. Furthermore, the controller 45 monitors protocols used in the base station and notifies and manages timing information.

The sector selector and signal combiner 48 combines the signals supplied from the channel elements 47, followed by conversion to transmitting signals through the use of the RF-UNITS. In the present example, the RF-UNIT 41 and the RF-UNITs 42 and 43 transmit the signals to the a-sector used as the W-sector and the a-1 sector and a-2 sector used as the N-sectors through the use of different antennas respectively.

A summary of the operation of the base station transmission system is as follows:

Down line signals transmitted from the VLP 49 are first subjected to scrambling based on coding, orthogonal coding, etc. by each individual channel elements 47 every lines. Afterwards, they are transferred to the sector selector and signal combiner 48. According to instructions issued from the controller 45, the signals are distributed based on suitable power distributions by one sector or plural sectors according to the attributes thereof and transmitted through the antennas set for the sectors.

(V-3) Base Station Reception System

A description will next be made of a configuration and operation of a base station reception system according to the present invention with reference to FIG. 6.

Figure 6:
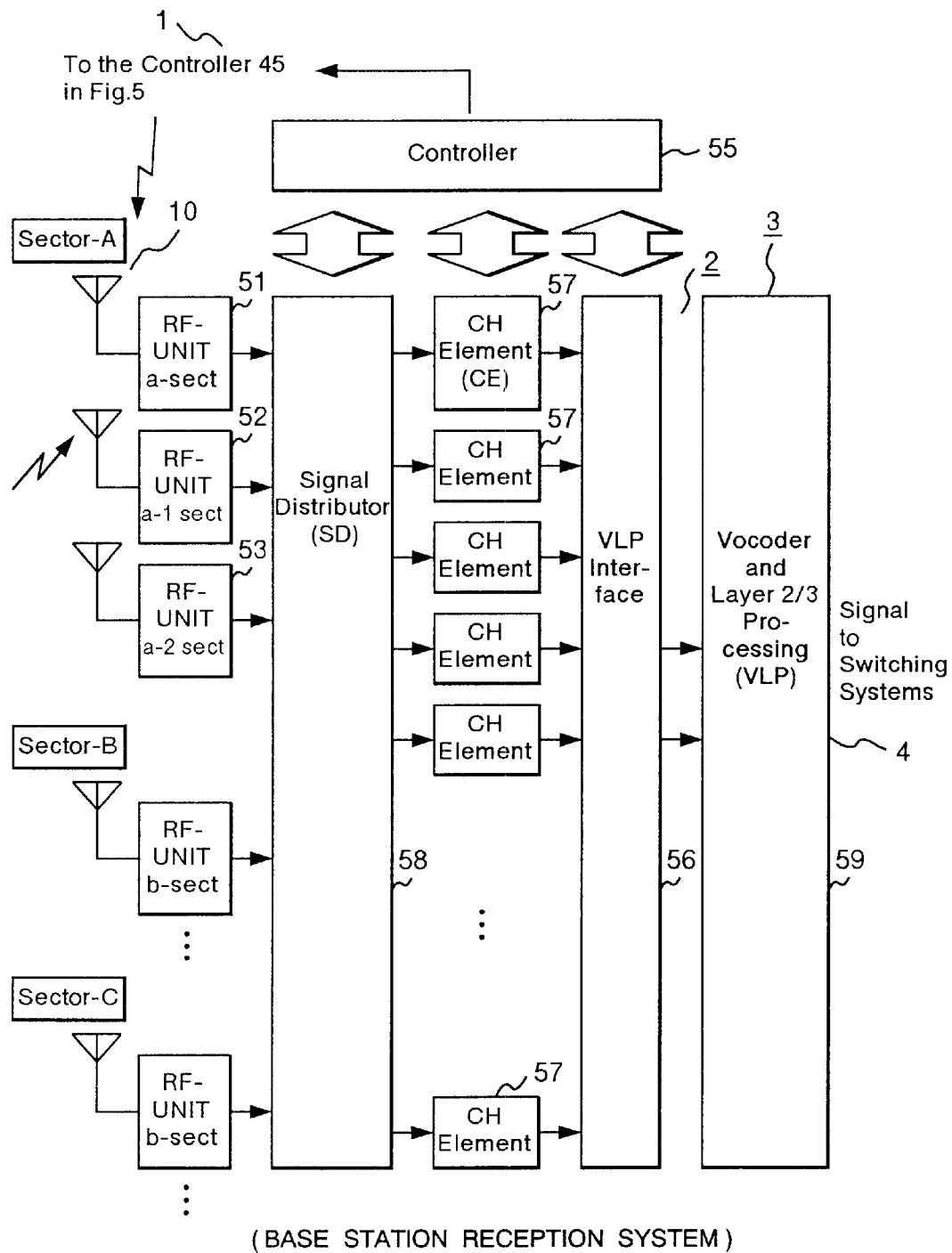
FIG. 6 is a block diagram depicting a configuration of a base-station reception system according to the present invention.

FIG. 6 is a block diagram showing a configuration of the base station reception system according to the present invention.

The base station reception system is also represented in the form of symbols in a manner similar to the transmission system.

The base station reception system comprises RF-UNITs 51 to 53 electrically connected to their corresponding antennas, a controller 55, a VLP interface 56, channel elements (CH elements) 57, and a signal distributor 58. A base station controller or control device 3 is provided with a VLP 59 having a vocoder and layer 2/3 processing unit and processes transmitting signals sent to exchanges of switching systems 4. The output of the VLP interface 56 is inputted to the VLP 59 of the base station 1 through a communication line 2. The controller 55 is electrically connected to the controller 45 of the transmission system to perform data swapping. The controllers 45 and 55 may be implemented by one controller.

The VLP interface 56 has a multiplexer and is a part which governs or controls a format converting function in a manner similar to the base station transmission system. Further, the VLP interface 56 also has the function of serving as a transmission device provided between the channel elements 57 and the VLP 59.

The controller 55 collects received power information at the RF-UNITs 51 through 54 or the like, the signal distributor 58 and the channel elements 57 and performs confirmation as to whether they are operated as pre-set system parameters and corrections of operation or the like. Further, the controller 55 manages resources (assigned hardware, codes, signal power, allowable interference power) about the assignments of the channel elements 57 to reception lines. Furthermore, the controller 55 monitors protocols used in the base station and performs notification and management or he like of timing information.

The RF-UNIT 51 receives a signal therein with respect to an a-sector used as a W-sector, whereas the RF-UNITs 52 and 53 receive signals therein with respect to a-1 and a-2 sectors used as N-sectors, respectively. The signals received through the antennas for the sectors are subjected to filtering and down-converted by the RF UNITs 51 through 53 and the like, followed by distribution to the signal distributor 58. Further, the received signals are demodulated by the respective channel elements 57 respectively.

It should be noted that if the sectors are taken so as to avoid the N-sectors from overlaying although the W-sector and each N-sector are overlaid with each other, then the signal received at each N-sector is one at most even when the signals received by the antennas for the W- and N-sectors are combined together at the respective channel elements.

Receiving power at each individual sectors and Eb/No (corresponding to an index indicative of an energy ratio between an objective signal and noise) at the respective channel elements are managed or controlled by the controller 55. They are used as power control information for Rake combination at the channel elements and to the wireless terminal. Besides, they are reflected on power distributions set every W- and N-sectors in the transmission system.

(VI) Control on Line (Channel) Unit of Base Station

A description will first be made of a configuration of a control function of a channel unit for a base station with reference to FIG. 7.

Figure 7:
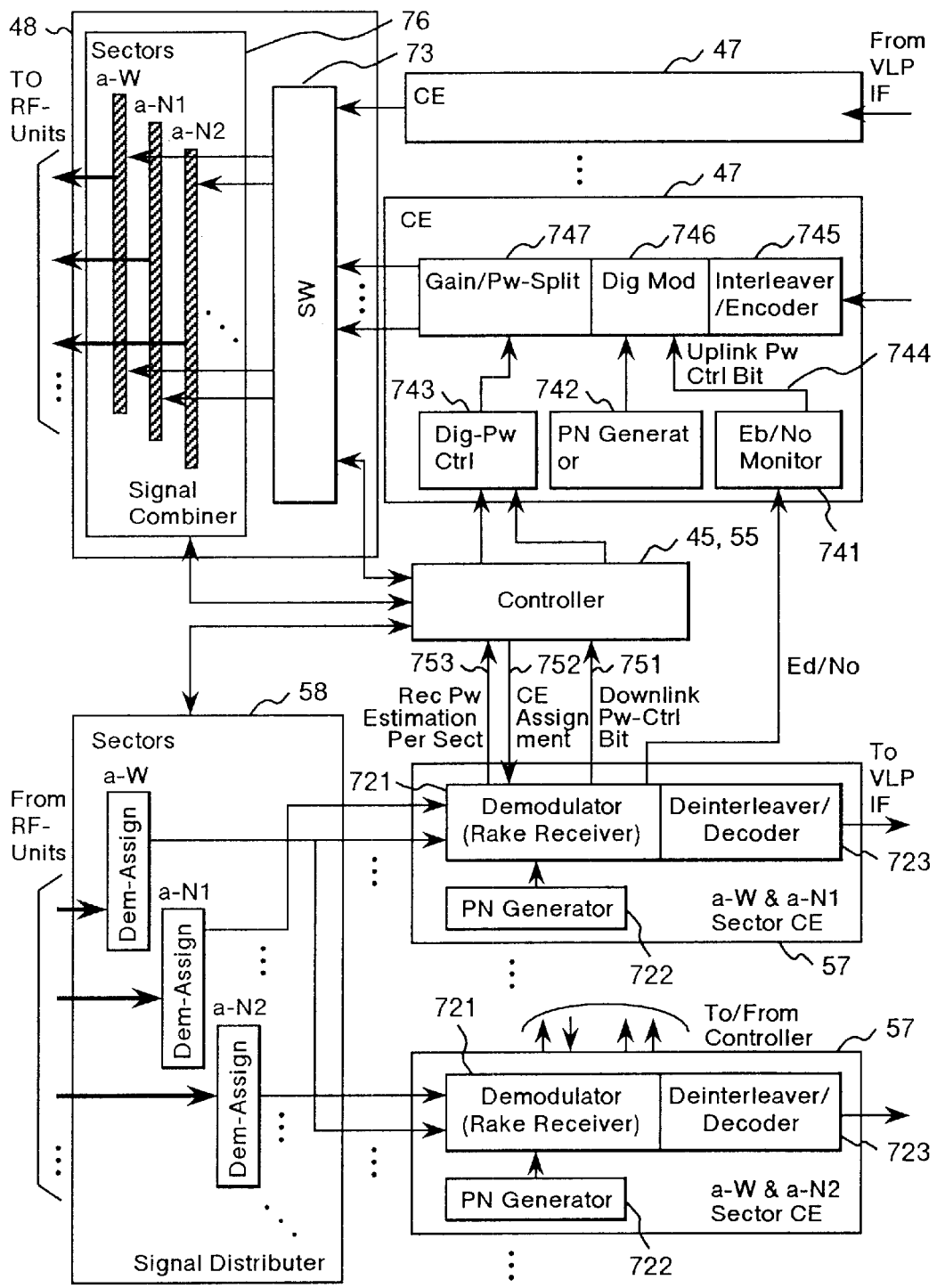
FIG. 7 is a block diagram showing a configuration of a control function of a channel unit in a base station according to the present invention.

FIG. 7 is a block diagram showing a configuration of the control function of the channel unit for the base station according to the present invention.

In the channel unit, a signal distributor 58 and channel element reception systems 57 set every channels are provided as a reception system. Further, a signal combiner 76, a switch 73 (corresponding to one represented as the sector selector and signal combiner 48 in FIG. 4) and cannel element transmission systems 47 set every channels are provided as a transmission system. There are also provided controllers 45 and 55 for respectively controlling respective functions.

The channel element reception system 57 has a demodulator 721 including a Rake receiver, a PN generator 722 for operating the demodulator 721, and a deinterleaver/decoder 723.

On the other hand, the channel element transmission system 47 includes an Eb/No monitor 741, a PN generator 742, a Dig-Pw ctrl 743, an interleaver/encoder 745, a Dig Mod 746 and a Gain/Pw-Split 747.

Incidentally, elements of elements shown in FIGS. 5 and 6, which are unnecessary for description of the control on the channel unit, are omitted in FIG. 7.

(VI-2) Operation of Base Station Reception System in Channel Unit

The operation of the base station reception system in the channel unit will next be explained based on the above configuration.

A signal transmitted from a given wireless terminal and received by each of antennas for respective sectors is amplified by the RF-UNITs 51 through 53 shown in FIG. 6 and converted down into a frequency range, followed by transmission to the signal distributor 58.

The signal distributor 58 includes filtering, a gain adjustment, sampling for digital signal conversion, the distribution of signals to their corresponding channel elements, etc. as main functions. The transmitted signals are inputted to the channel element reception systems 57 as signals subjected to these processes. The signal distributor 58 effects code searching and synchronization on the received signals at the sectors, demodulates the received signals set in a particular code sequence, and assigns and distributes the demodulated signals to their corresponding channel element reception systems 57. As noted even previously, received signals for a plurality of N-sectors are not inputted to one channel element reception system 57. When the received signals cannot be detected by any N-sector, the received signal is distributed to each channel element reception system 57 at the W-sector alone.

The channel element reception system 57 performs inverse diffusion and Rake-combination of the received signals and decoding on error corrections thereto. The operation of the channel element reception system 57 is managed or controlled by the controller 55. The operation thereof related to the setting of power is associated with the transmission system through the controller 55.

The PN generator 722 outputs a PN code for identifying a wireless terminal and a radio line or channel. When the demodulator 721 determines it as a signal capable of obtaining a sufficient Eb/No, it locks the code outputted from the PN generator 722 and the phase thereof. The controller 55 can assign a channel to its corresponding channel element 57 (output of channel element assignment signal 752 (CE Assignment)).

A demodulated output produced from the demodulator 721 is transmitted to the deinterleaver/decoder 723, where the interleaved signal is deinterleaved, after which it is subjected to an error correction by the decoder.

Further, the channel element reception system 57 has the function of making a power control loop for controlling up-link transmitting power (in the direction of a base station as viewed from an up link and a wireless terminal) and down-link transmitting power (in the direction of the wireless terminal as viewed from a down link and the base station), and the function of estimating power received in sector units. These will be described later in the paragraph of (VI-4).

(VI-3) Operation of Base Station Transmission System in Channel Unit

The operation of the base station transmission system in a channel unit will next be explained.

In the channel element transmission system 47, the interleaver/encoder 745 effects error correction and coding and interleaving on transmitted information. According to instructions issued from the controller 45, the PN generator 742 assigns codes such as a PN code to users. The Dig. Mod 746 performs diffusion by using the assigned codes. In this process, the Eb/No monitor 741 inserts an uplink power control bit 744 therein. The uplink power control bit 744 is information for controlling transmitting power according to the strength of the received signal from the wireless terminal. The power control will next be described in detail.

Further, the Gain/Pw-Split 747 in each channel element transmission system 47 determines the gain of a digital signal.

(VI) Power Control

A description will next be made of power control executed by the communication system according to the present invention.

The power control loop function bears the principal role of power control. The base station measures the strength of each received signal and sets information thereabout to an uplink power control bit. Further, the base station notifies it to the corresponding wireless terminal. Thus, when a report that the signal received by the base station is weak, is given to the wireless terminal, the wireless terminal strengthens an uplink signal (wireless-terminal transmission).

In a down link (one transmission by the base station) to the contrary, the wireless terminal is caused to report the strength of each signal form the base station as a downlink power control bit. Further, the strength of each signal transmitted by the base station is controlled according to its report.

Further, the present invention was characterized in that the two types of sectors, i.e., the W-sector and N-sectors were provided. Even in the case of the power control, receiving power set every W- and N-sectors are monitored to take full advantage of such a feature. This is performed in the following manner. The strengths of receiving power every channels are measured and the receiving power for the sectors are determined as the sum of the channels which belong to their sectors. Further, power for the transmitting signals are distributed according to the ratio between the receiving power set for every sectors. Thus, since the transmitting signals become weak in power in the case of sectors in which the received signals are weak in strength, and the transmitting power becomes strong in the case of sectors in which the received signals are strong in strength, control on effective transmitting power can be effected on a terminal which is to communicate with the base station.

(VI-1) Power Control Loop

As described above, power control loops for the uplink (transmission of wireless terminal) and the downlink (one transmission of base station) are included as the power control loop.

In the uplink power control, Eb/No of each received signal demodulated by the demodulator 721 is compared with a threshold value by the Eb/No monitor 741. Further, the uplink power control bit 744 is set to a transmitting signal according to the result of comparison (Set Uplink Pw-Ctrl Bit). The wireless terminal adjusts transmitting power according to the bit. Namely, when the received signal is regarded as weak in strength, the transmitting power of the wireless terminal is controlled so as to become strong.

On the other hand, since the base station 1 itself cannot measure downlink power, it is necessary to cause the wireless terminal to report it. Namely, the wireless terminal performs downlink to thereby set a downlink power control bit according to the strength of each received signal from the base station and transmits it to the base station 1.

The base station 1 extracts the corresponding downlink power control bit from the demodulated output produced from the demodulator 721 and transmits the result of extraction to its corresponding channel element transmission system 47 as an extract downlink power control bit (Extract Downlink Pw-Crtl Bit) signal 751 through the controller 55. The transmission system controls or adjusts even the transmitting power for the corresponding channel (even for the W-sector as well as for each N-sector) to a determined ratio according to the bit.

(VI-2) Distribution of Sector Transmitting Power

A description will next be made of a method of assigning transmitting power for data on a traffic channel of a base station to the W- and N-sectors with reference to FIG. 8.

Figure 8:
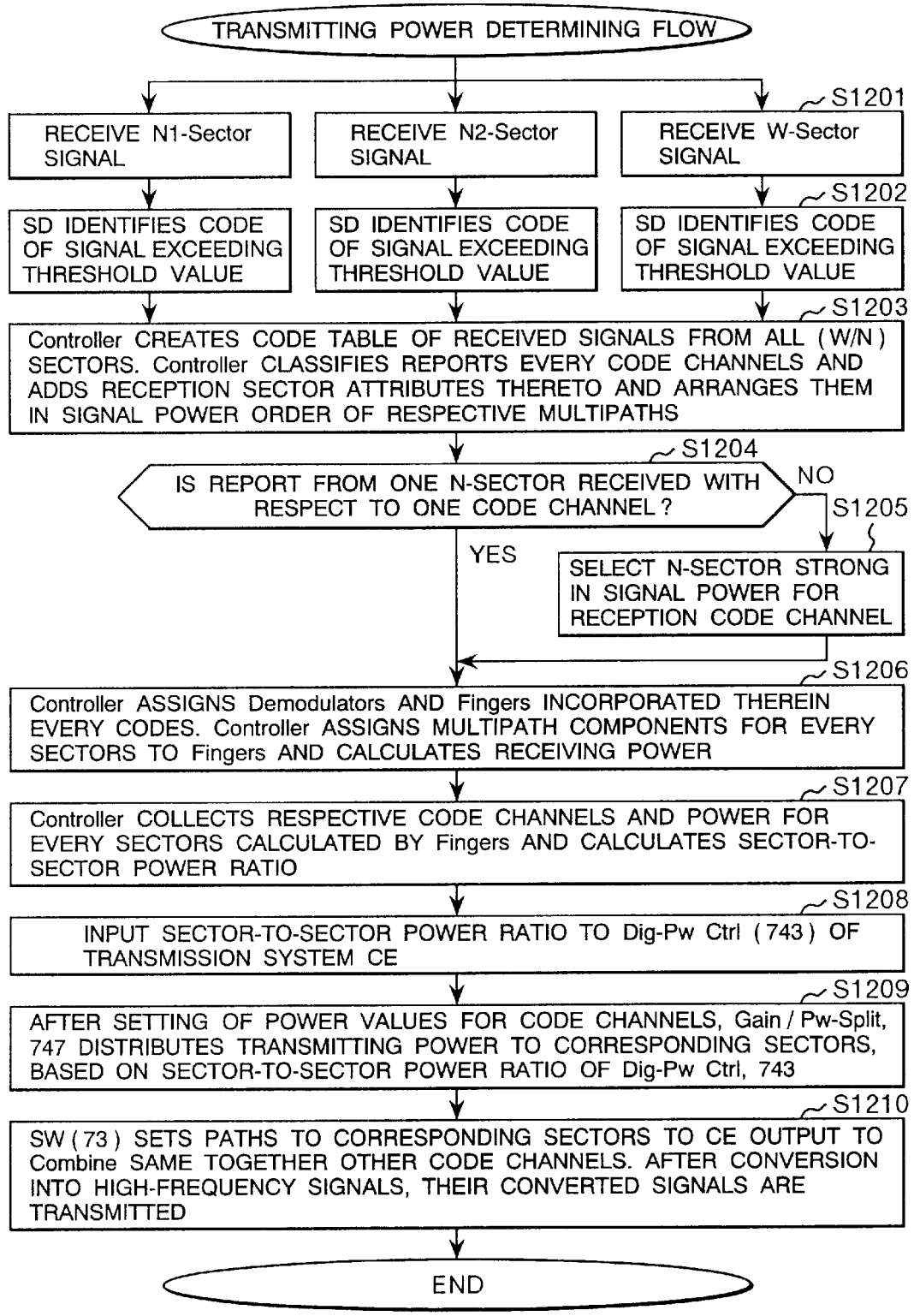
FIG. 8 is a flowchart illustrating a power assignment algorithm for each sector.

FIG. 8 is a flowchart showing an algorithm for assigning power to respective sectors.

First of all, the antennas for the W- and N-sectors receive signals respectively (S1201). The signal distributor 58 identifies code channels of the signals having receiving power exceeding a given threshold value and reports their codes and receiving power to the controller 55 (S1202). The controller 55 records reports sent from the signal distributor 58 in a code table every code channels (S1203). When reports from the two N-sectors are given for one code channel (S1204), the controller selects the corresponding N-sector strong in receiving power (S1205).

The demodulator 721 incorporates a plurality of Finger circuits (multipath-ready receiving circuits) therein. In the demodulator 721, one multipath component, i.e., a signal from the W-sector and a signal from each N-sector are assigned to one Finger. The demodulator 721 calculates receiving power every Finger circuits. The demodulator 721 reports signal power estimated every Finger circuits and sectors having received the signals to the controller 55 as a signal 753. The controller 55 totalizes the receiving power every channels and calculates the sum of receiving power set every sectors according to the sectors which belong to the channels. At this time, sector-to-sector power distribution values of the receiving power are defined as sector-to-sector power distribution values in the transmission system as they are (S1207).

Information about each sector-to-sector power distribution value is inputted to the Dig-Pw Ctrl 743 of each channel element 47 (S1208). A transmitting signal is inputted to the interleaver/encoder 745 and the Dig. Mod 746. The Gain/Pw-Split 747 adjust or controls the gain of transmitting power set for each channel based on the information sent from the Dig-Pw Ctrl 743. At this time, the Gain/Pw-Split 747 distributes power set for each sector according to the power ratio received in Step 1208 (S1209). Thereafter, the switch 73 performs switching between paths lying between the channel elements 47 and the signal combiner 76. Thus, the signals for the respective sectors are respectively complex-modulated by the RF-Units (high-frequency circuit) and transmitted through the antennas (S1210).

The controller 45 executes Steps 1203 through S1208 for each predetermined cycle to thereby bring a transmitting power ratio up to date each time.

Incidentally, while a description has been made of the case where the W-sector is overlaid with the two N-sectors in the flowchart shown in FIG. 8 as adopted in the present embodiment, the present algorithm can be applied similarly even to a case where one N-sector exists and a case where three or more N-sectors exist.

While the distribution of the transmitting power between the N-sectors and the W-sector is changed according to the receiving power in the above description, the distribution of the transmitting power between the sectors may be carried out according to a certain defined constant ratio without depending on such strength of receiving power.

A second embodiment according to the present invention will be described below.

While the first embodiment has described the method of performing the power control according to the position of each wireless terminal, factors for control of the communication system can be considered in various ways in addition to the method.

The directions, angles, forms, etc. of respective sectors may be set and changed based on a position distribution and statistical data of wireless terminals, for example. Such settings and changes can be executed by providing a control device for controlling the directions and directivity of the antennas at an input/output unit 10. Further, these controls may be utilized in combination with the aforementioned power control.

A third embodiment according to the present invention will be explained below with reference to FIG. 9.

Figure 9:
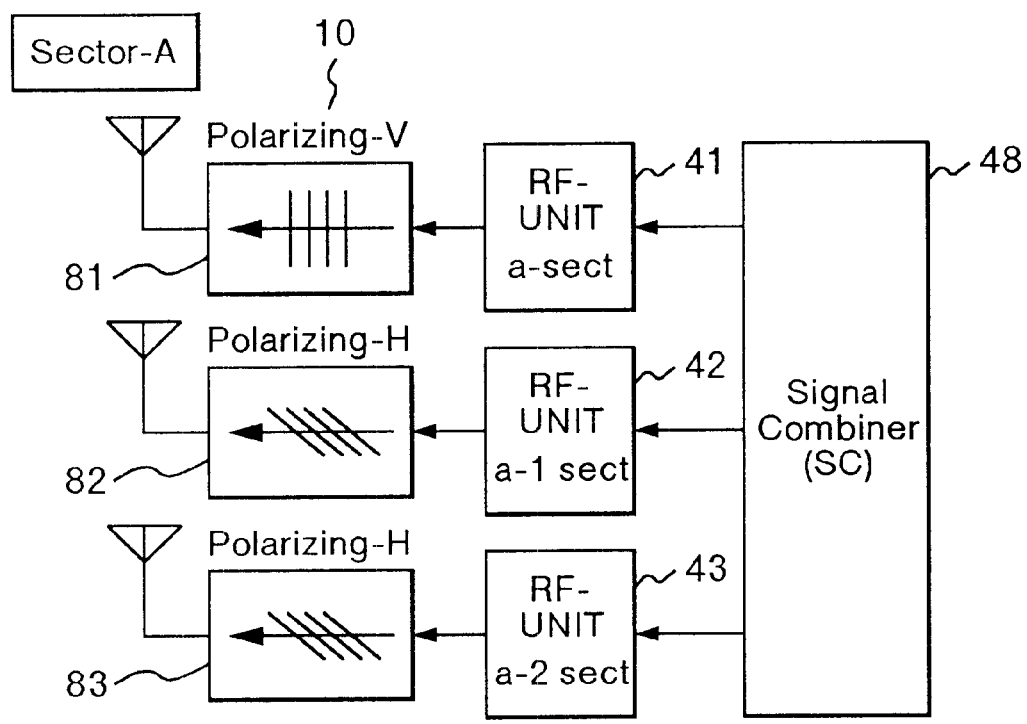
FIG. 9 is a conceptional diagram showing a configuration of a base-station transmission system having a polarization transmitting function.

FIG. 9 is a conceptional diagram showing a configuration of a base station transmission system having a polarization transmitting function.

The present embodiment is one using a so-called polarization diversity function.

When the W-sectors and the N-sectors are set as shown in FIG. 1, for example, orthogonal polarization can be applied between the W- and N-sectors in consideration of interference to improve channel quality. In the base station 1 in this case, the distribution of power per user channel is set at the W- and N-sectors and separated into both polarization for transmission, whereas the wireless terminal is provided with a receiver having a polarization separating/combining function, whereby polarization diversity can be implemented.

The representation of the sectors such as an a-sector, etc. in the form of symbols is similar to the embodiment 1. The base station transmission system shown in FIG. 9 is different in configuration from the base station transmission system shown in FIG. 5 in that high-frequency units or RF-UNITs 41 through 43 are respectively provided with polarization units 81 through 83. As an illustrative example herein, an a-sector used as a W-sector is provided with the polarization unit 81 for providing V (Vertical) polarization, whereas the a1-sector and a2-sector used as N-sectors are respectively provided with the polarization units 82 and 83 for respectively providing H (Horizontal) polarization. Similar polarization units may be provided even for the base station reception system. Further, any of the sectors may be suitably set to the vertical polarization and the horizontal polarization. Furthermore, other polarization such as circular polarization, etc. may be applied.

A fourth embodiment according to the present invention will be described below using FIG. 10.

Figure 10:
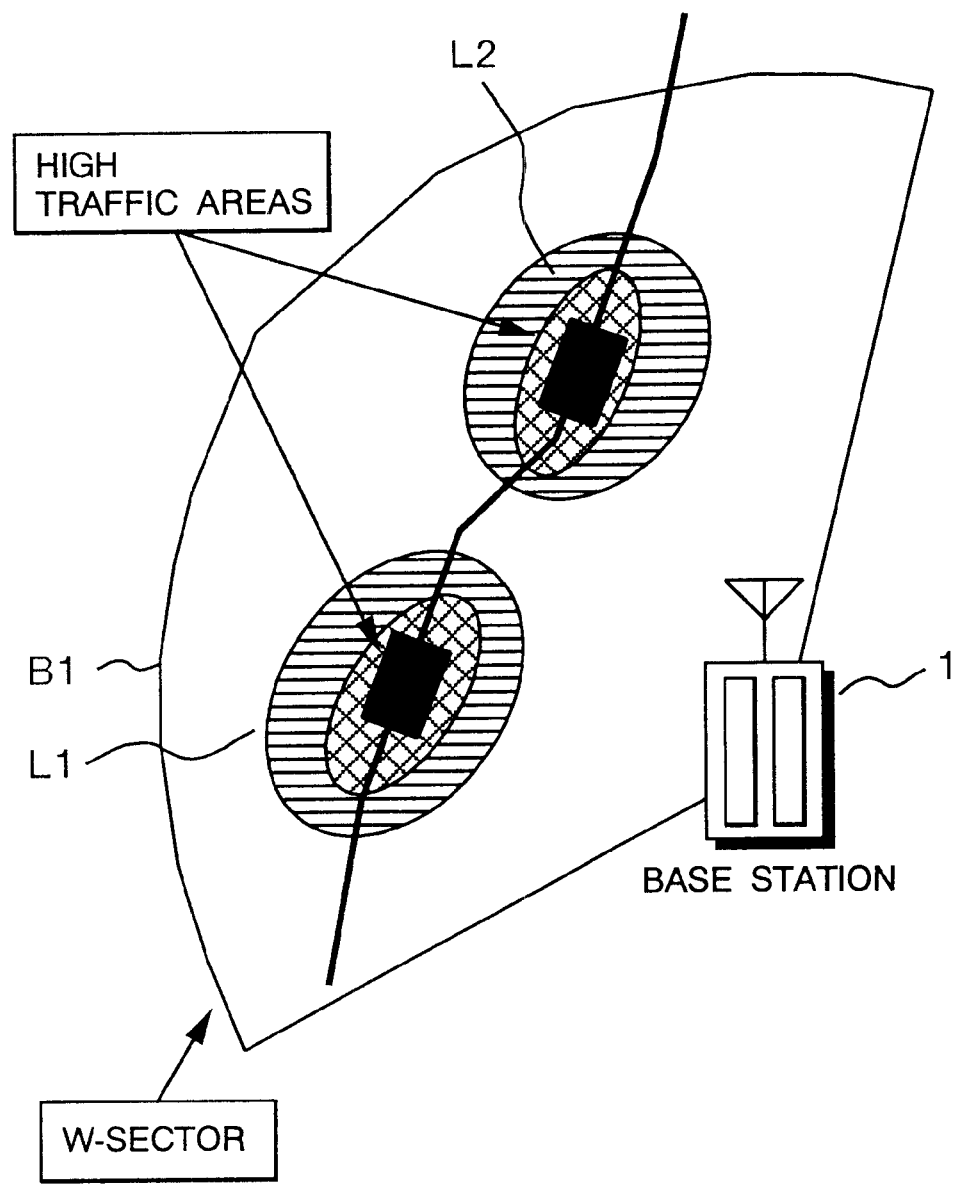
FIG. 10 is a conceptional diagram depicting a sector model for cellular communications, according to a second embodiment of the present invention.
Figure 11:
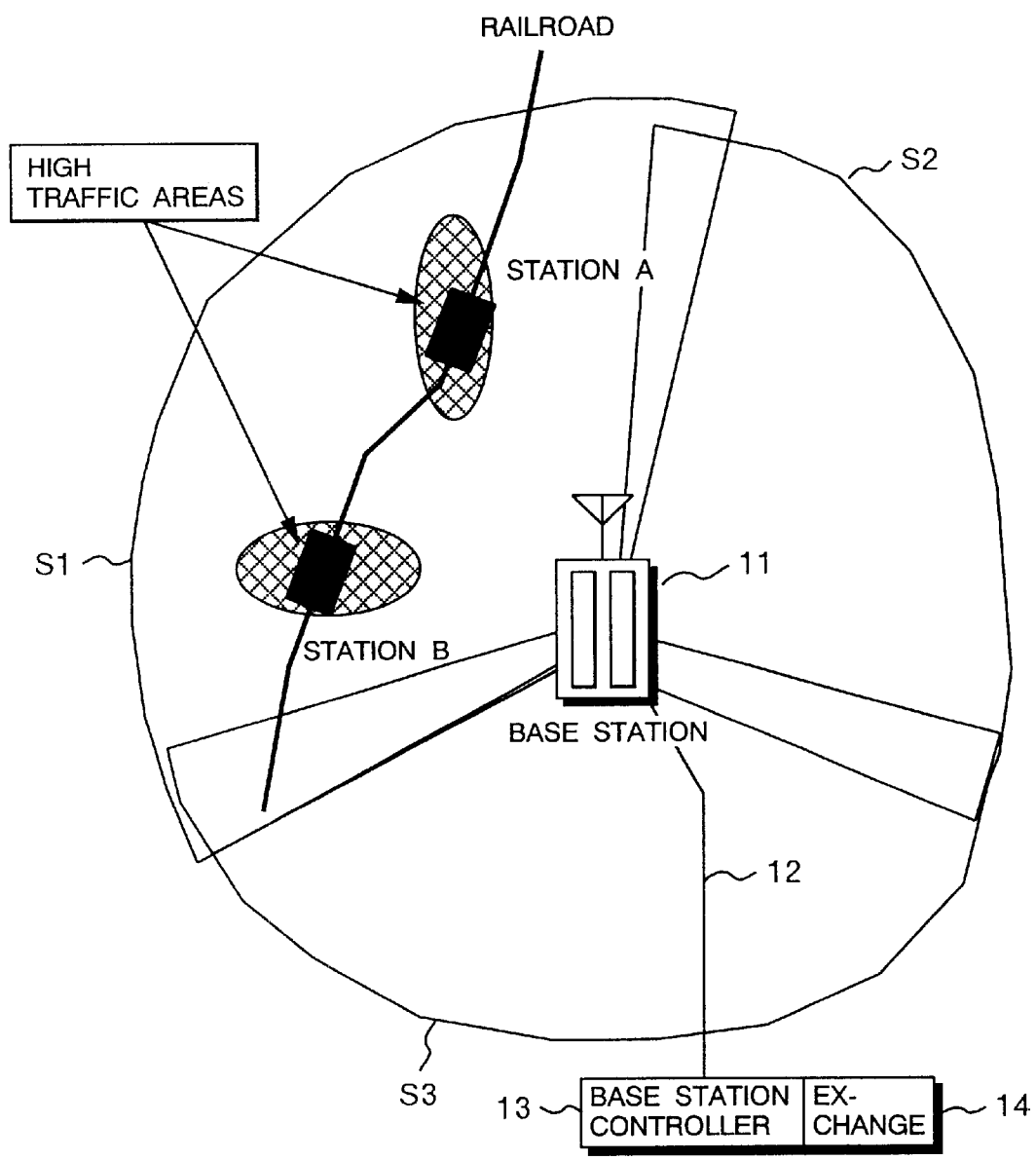
FIG. 11 is a conceptional diagram showing a configuration of a communication model suitable for a radio communication system according to the prior art.

FIG. 10 is a conceptional diagram showing a sector model for a cellular communication, according to the second embodiment of the present invention.

While the N-sectors have been arranged over each W-sector in sector form in the first embodiment, other overlay arrangements may also be considered.

While the overlay has been achieved by the wide angle sector and narrow angle sectors in the aforementioned description, the present invention can be applied even to others.

An example illustrative of sector arrangements, which is shown in FIG. 10, is one wherein stations B and A corresponding to locations indicative of high traffic areas in a large sector B1 are overlaid with elliptical small sectors L1 and L2 small in diameter on a spot basis. In this case, RF-UNITs and antennas are placed away from a base station. In the present example, the antennas would be considered to be actually placed in both stations located in the centers of the sectors. A signal combiner and a signal distributor are implemented in one base station. When a plurality of small sectors (or N-sectors) are included in one large sector as shown in FIGS. 1 and 9, coverages for the small sectors or N-sectors must be placed so as not to overlap.

In the embodiment 1, both the W-sectors and N-sectors have been used only upon transmission of the data through each traffic channel of the base station. However, both sectors may be used for the transmission of data through all the channels including overhead channels (Pilot channel, Paging channel, etc. in the case of downlink of IS-95A).

[Features and Effects of the Invention, Which are Understood from the Present Embodiments]

As is understood from the above-described embodiments, the configurations of the radio communication method and the radio communication system both according to the present invention have the following features:

(1) In an area in which a W-sector (wide angle sector) is overlaid with N-sectors (narrow angle sectors), capacity increases by an amount corresponding to transmittable power (however, the maximum capacity of the overlaid area is equivalent to the maximum capacity at the operation made in one sector). Thus, the setting of the N-sector's overlaid area in the W-sector in one or plural form makes it possible to increase communication capacity only in a traffic-increasing area and to effectively cope with traffic's spatial biasing.

(2) Since the W-sector and the N-sectors are operated at the same frequency and the same code channels are used in synchronism with each other, capacity corresponding to an overhead developed due to hand-off necessary for multi-sectoring becomes unnecessary without sector-to-sector identification regardless of an increase in the number of sectors.

(3) Since power corresponding to traffic other than N-sector's overlaid areas may be transmitted in the W-sector with the minimum power necessary for covering a service area, transmitting power can be less restricted and hence power-savings can be achieved.

According to the present invention as described above, there can be provided a radio communication method and a radio communication system wherein even if traffic concentrates on a specific place in a cellular radio communication in which a base station communicates with its corresponding wireless terminal, power to be used up or consumed by the base station can be restricted, and the equality of communication is good and the need for a change in the conventional wireless terminal is eliminated.

While the present invention has been described with reference to the illustrative embodiments, this description is not intended to be construed in a limiting sense. Various modifications of the illustrative embodiments, as well as other embodiments of the invention, will be apparent to those skilled in the art on reference to this description. It is therefore contemplated that the appended claims will cover any such modifications or embodiments as fall within the true scope of the invention.

What is claimed is:

1. A cellular radio communication method for performing communications between a base station and each of wireless terminals, comprising the steps of:

dividing a cell for covering the base station into several sectors;

defining the sectors as a wide range sector and two types of narrow range sectors which overlap with the wide range sector;

separately preparing a wide range antenna for covering the wide range sector and narrow range antennas for respectively covering the narrow range sectors within the base station; and transmitting signals to wireless terminals located within the narrow range sectors by using both the wide range antenna and the narrow range antennas.

2. A radio communication method according to claim 1, wherein the signal transmitted through the wide range antenna and the signals transmitted through the narrow range antennas are substantially the same signal.

3. A radio communication method according to claim 1, wherein when a plurality of narrow range sectors exist within one wide range sector, respective coverages for the plurality of narrow range sectors do not completely overlap in position.

4. A radio communication method according to claim 3, wherein the base station receives signals sent from the wireless terminals by the wide range antenna and one narrow range antenna and combines both received signals together to thereby extract a combined signal.

5. A radio communication method according to claim 4, wherein the communications between the base station and the wireless terminals are based on CDMA (Code Division Multiple Access).

6. A radio communication method according to claim 5, wherein the base station transmits only a signal on a traffic channel within channels handled by CDMA by using both the wide range antenna and one narrow range antenna.

7. A radio communication method according to claim 5, wherein the base station extracts downlink power control information included in the signals sent from the wireless terminals and controls transmitting power directed toward said each wireless terminal according to the downlink power control information upon transmission of the signals through the wide range antenna and said one narrow antenna.

8. A radio communication method according to claim 4, wherein the base station controls a transmitting power ratio directed toward said each wireless terminal according to the ratio between the strengths of the signals from the wireless terminals, which are received by the wide range antenna and the narrow range antennas upon transmitting the signals through the wide range antenna and said one narrow range antenna.

9. A radio communication method according to claim 4, wherein the transmitting power ratio directed toward the wireless terminal is determined in advance by the base station upon transmitting the signals through the wide range antenna and the narrow range antennas.

10. A radio communication method according to claim 4, wherein both the base station and the wireless terminal Rake-combine received signals upon combination thereof.

11. A cellular radio communication system for performing communications between a base station and each of wireless terminals, comprising:

a cell for covering the base station, said cell being divided into several sectors;

said sectors being defined as two types of sectors corresponding to a wide range sector and narrow range sectors overlapping with the wide range sector, and said narrow range sectors having coverages provided so as not to overlap in position;

said base station including, a wide range antenna which covers the wide range sector;

narrow range antennas which respectively covers the narrow range sectors;

a transmitter which transmits signals to wireless terminals located within the narrow range sectors by using the wide range antenna and the narrow range antennas;

a receiver which combines a signal received by the wide range antenna and signals received by the narrow range antennas together to thereby extract a combined signal; and a controller which controls the transmitter and the receiver; and said controller controlling the transmitter so that said transmitter transmits signals to the wireless terminals located within the narrow range sectors through both the wide range antenna and said one narrow range antenna.

12. A radio communication system according to claim 11, wherein the communications between the base station and said each wireless terminal are based on CDMA, and said controller in said base station controls the transmitter so that said transmitter transmits signals on traffic channels through the wide range antenna and said one narrow range antenna.

13. A radio communication system according to claim 11, wherein said controller in said base station controls a transmitting power ratio directed toward said each wireless terminal according to the ratio between the strengths of the signals from the wireless terminals, which are received by the wide range antenna and the narrow range antennas upon transmitting the signals through the wide range antenna and said one narrow range antenna.

14. A radio communication system according to claim 11, wherein said wide range antenna and said each narrow range antenna of said base station transmit polarized signals different from one another, and said each wireless terminal has an antenna for receiving both polarized signals and a receiver for combining the received polarized signals together to thereby take out a combined signal.

15. A base station suitable for use in a cellular radio communication system for carrying out communications between the base station and each of wireless terminals, wherein a cell for covering the base station is divided into several sectors, which are defined as two types of sectors corresponding to a wide range sector and narrow range sectors overlapping with the wide range sector, and said narrow range sectors have coverages provided so as not to overlap in position; and said base station including, a wide range antenna which covers the wide range sector;

narrow range antennas for respectively which covers the narrow range sectors;

a transmitter which transmits signals to wireless terminals located within the narrow range sectors by using the wide range antenna and the narrow range antennas;

a receiver which combines a signal received by the wide range antenna and signals received by the narrow range antennas together to thereby extract a combined signal; and a controller which controls the transmitter and the receiver; and said controller controlling the transmitter so that said transmitter transmits signals to the wireless terminals located within the narrow range sectors through both the wide range antenna and said one narrow range antenna.

\* \* \* \* \*